United States Patent
Casner et al.

(10) Patent No.: US 8,274,901 B1
(45) Date of Patent: Sep. 25, 2012

(54) SYSTEM AND METHOD FOR ASSISTING IN TROUBLESHOOTING A NETWORK HANDLING VOICE OVER INTERNET PROTOCOL TRAFFIC

(75) Inventors: Stephen L Casner, Sunnyvale, CA (US); Kedar Poduri, Santa Clara, CA (US); Rodrigo G Alonso, San Jose, CA (US); Cengiz Alaettinoglu, Sherman Oaks, CA (US); Van Jacobson, Woodside, CA (US)

(73) Assignee: Packet Design, Inc., Santa Clara, CA (US)

( * ) Notice: Subject to any disclaimer, the term of this patent is extended or adjusted under 35 U.S.C. 154(b) by 332 days.

(21) Appl. No.: 11/517,071

(22) Filed: Sep. 6, 2006

Related U.S. Application Data

(60) Provisional application No. 60/714,690, filed on Sep. 6, 2005.

(51) Int. Cl.
*H04J 3/14* (2006.01)
(52) U.S. Cl. ......... 370/248; 370/216; 370/252; 370/352
(58) Field of Classification Search .................. 370/216, 370/252, 235, 248; 709/224, 225; 379/32.01, 379/32.02, 112.01
See application file for complete search history.

(56) References Cited

U.S. PATENT DOCUMENTS

| | | | | |
|---|---|---|---|---|
| 6,167,025 A * | 12/2000 | Hsing et al. | .................... | 370/216 |
| 6,266,339 B1 * | 7/2001 | Donahue et al. | .............. | 370/432 |
| 6,381,306 B1 * | 4/2002 | Lawson et al. | .............. | 379/32.01 |
| 6,385,444 B1 * | 5/2002 | Peschel et al. | ................. | 455/405 |
| 6,553,107 B2 * | 4/2003 | Jarvi et al. | ................ | 379/114.03 |
| 2002/0127993 A1 * | 9/2002 | Zappala | ......................... | 455/404 |
| 2002/0131362 A1 * | 9/2002 | Callon | .......................... | 370/216 |
| 2003/0076936 A1 * | 4/2003 | Locke et al. | .............. | 379/112.01 |
| 2003/0086425 A1 * | 5/2003 | Bearden et al. | ................ | 370/392 |
| 2005/0002400 A1 * | 1/2005 | Karol et al. | .................... | 370/394 |
| 2006/0258339 A1 * | 11/2006 | Connelly et al. | ........... | 455/414.1 |
| 2006/0268826 A1 * | 11/2006 | Son | .............................. | 370/352 |
| 2007/0019559 A1 * | 1/2007 | Pittelli et al. | .................. | 370/248 |

* cited by examiner

*Primary Examiner* — Ricky Ngo
*Assistant Examiner* — Rasheed Gidado
(74) *Attorney, Agent, or Firm* — Innovation Partners; Charles E. Gotlieb

(57) ABSTRACT

A system and method allocates dropped packets from a call detail record in a voice over Internet Protocol to links or nodes the call traversed, and to events that occurred during the call and prefixes corresponding to the phones used in the call, along with a report in decreasing order of the dropped packets for the nodes, links, events and prefixes, to allow a system administrator to help identify the source of the dropped packets.

2 Claims, 4 Drawing Sheets

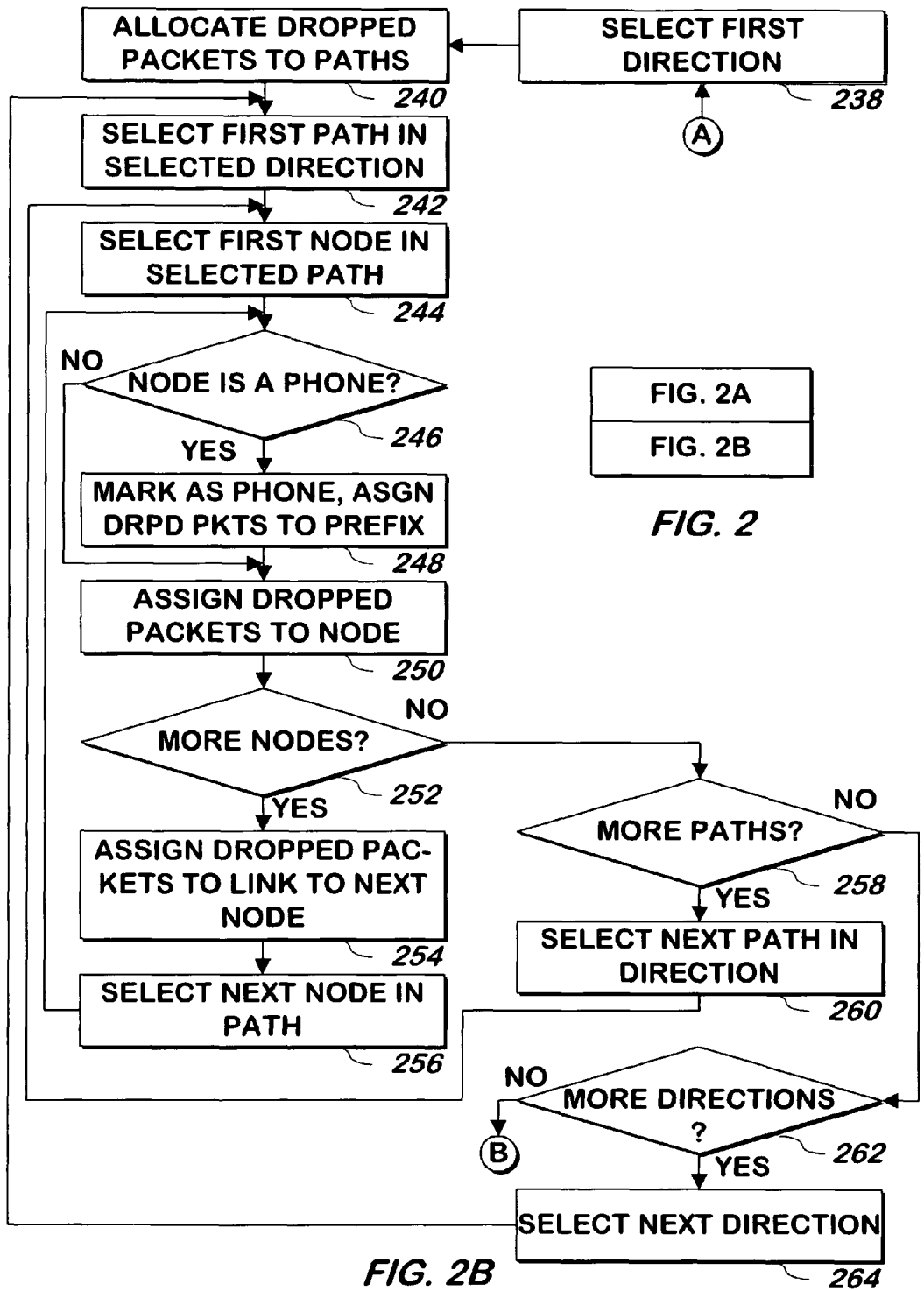

SYSTEM AND METHOD FOR ASSISTING IN TROUBLESHOOTING A NETWORK HANDLING VOICE OVER INTERNET PROTOCOL TRAFFIC

RELATED APPLICATION

This application claims the benefit of U.S. Provisional Patent Application Ser. No. 60/714,690 entitled, "Method and Apparatus for Assisting in Troubleshooting a Network Handling Voice Over Internet Protocol Traffic," filed on Sep. 6, 2005 by Stephen L. Casner, Kedar Poduri, Rodrigo Alonso, Cengiz Alaettinoglu and Van Jacobson, having the same assignee as the present application, and is hereby incorporated by reference in its entirety.

FIELD OF THE INVENTION

The present invention is related to computer software and more specifically to computer software for network analysis.

BACKGROUND OF THE INVENTION

Conventional PBX telephone systems are being replaced with voice over IP telephones that use the Internet instead of the public switched telephone network. When the user of one IP telephone wishes to dial the user of another IP telephone in the same telephone system, the calling party's telephone communicates with a call manager and identifies the extension or other number of the called party. Although two parties are specified as being on the phone call for purposes of example, calls may be multiparty calls. The call manager identifies the IP address of the called party's telephone and communicates the IP address to the calling party's telephone. The telephones then establish an IP session and transfer the digitized voice and any control signals between themselves.

When the call is disconnected, each of the two telephones provide to the call manager a call detail record describing the called and calling party's IP addresses, the date and time the call was started and ended, the number of packets sent and received, and certain potential problem reports, such as the number of packets that were lost, the jitter, which is a measure of the variation of time it took packets to be received, and latency, the amount of time between when the packet was sent and when it was received.

The call detail records from several calls can be summarized by the call manager and presented in report form to a system administrator to allow the system administrator to identify the quality of service being provided. If a large percentage of packets are dropped, for example, the quality of service can be quite poor, making calls that use a voice over IP telephone system inferior to calls made over a PBX system.

Unfortunately, although the reports the system administrator receives can indicate a problem with the network being used to transport the calls, the system administrator is not provided with information that is useful in fixing the problem. For example, if the source of the dropped packets is a node in the path between the two telephones that intermittently fails, the system administrator, armed only with the reports from the call manager, will have no idea how to fix the underlying source of the lost packets. Because voice over IP telephones can be much more sensitive to network problems than data traffic, conventional network monitoring tools that may be in use may not identify the network problems that are causing the problems with the voice over IP traffic.

What is needed is a system and method that can help pinpoint problems with a network that can be causing problems for voice over IP telephones.

SUMMARY OF INVENTION

A system and method records routing messages, such as ISIS, OSPF, EIGRP or any BGP protocol and the dates and times of such messages. The system and method also records the call detail records from the call manager for all calls, or a call detail record produced by the call manager by combining the call detail records of all of the telephones involved in a call. The call detail record includes the date and time the call was established and was disconnected, the IP address or addresses of the telephones involved in the call, and the number of dropped packets for that call. The clock used to record the routing messages may be synchronized to the clock used by the call manager so that the dates and times used by both are consistent. In one embodiment, the clocks may be synchronized to one or a pair of network time clocks.

A system administrator can then provide a period of study, and for each call that was in progress during the period of study, the system and method retrieves from the call manager the call detail records for calls in progress during the period of study. Using the routing messages and dates and times of such messages, and the date and time the call started and stopped and the IP addresses of the two telephones from the call detail record, the system and method identifies the best path or paths that were taken or likely taken by the packets that carried the voice over IP call. A best path is an optimal path according to one or more metrics, such as the best path according to costs assigned by a system administrator to each link in every path. The best path is identified using conventional best (e.g. least cost) path identification algorithms, and can include two or more paths between each phone in the call, one or more path in each direction used to carry the call data.

DETAILED DESCRIPTION OF A PREFERRED EMBODIMENT

Figure 1:
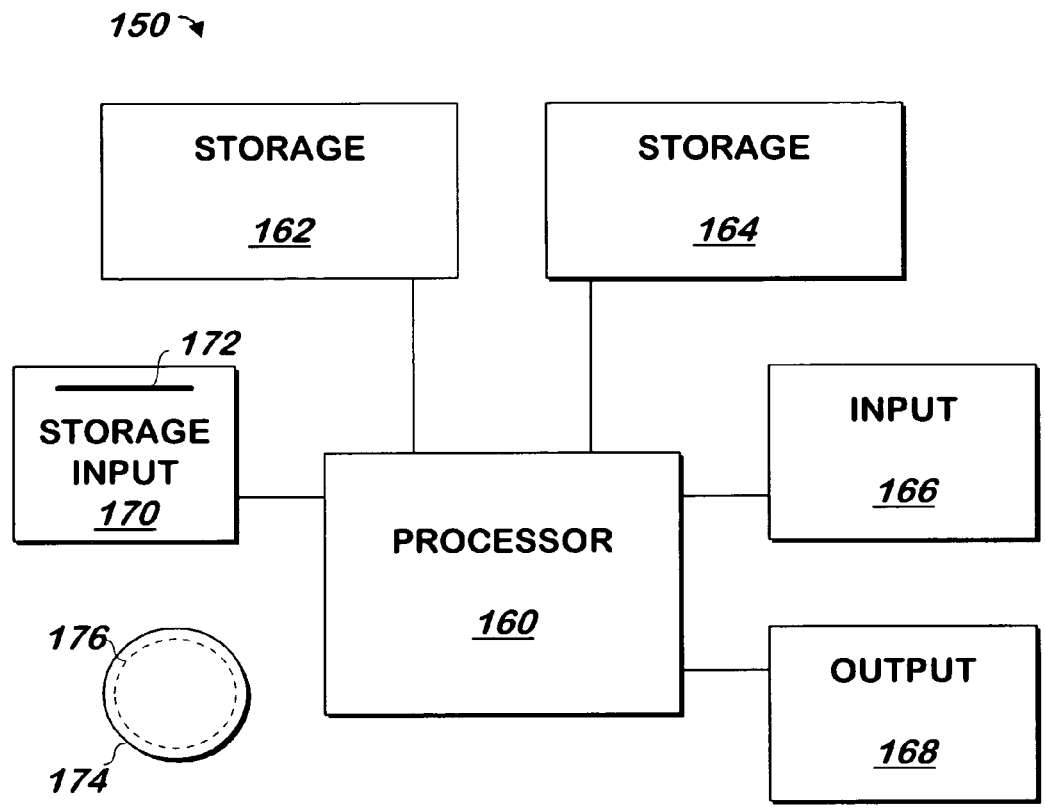
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running aversion of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

The present invention may be used to correlate reported problems of any kind to network failures, and the specific examples used herein are merely representative of one type of problem. In addition, as noted above, calls may have more than two parties and the present invention applies to multi-party calls as well.

Overview

Each path will be made up of nodes and links between the nodes. The system and method then assigns the lost packets from the call detail record to every link and node in the path, by adding the number of lost packets to a problem counter it maintains for each node and link traversed by any call. The dropped packets are described in the call detail record by direction (e.g. one count of dropped packet from phone A to phone B, and a different count of dropped packets is described from phone B to phone A) and so the number of dropped packets is assigned to the links and nodes in its respective path. (If the dropped packets were not so described, the number of dropped packets may be allocated to each direction: half to each direction or all to each direction).

Although dropped packets are used as a measure of service problems as described herein, other embodiments may use other measures of service, such as jitter, latency or MOS, a measure of perceived voice quality.

The two telephones are treated as nodes in the manner described above, but are marked as telephones for the purpose of specially reporting them as described in more detail below. In one embodiment, the number of dropped packets is also assigned to each prefix reported in the routing messages that correspond to each of the two telephones.

Accommodating Changes in Paths During A Call

During any call, the best path may change as links or nodes fail, and the best path between two telephones is rerouted around the failure. The system and method identifies as an "event" a change in a path due to a routing change, and the lost packets from calls in progress during the event that could have been affected by the change in path are similarly assigned to the event by adding the number of lost packets during the call to a counter for that event.

Because multiple paths may be used during the duration of any call, the lost packets may be allocated among the nodes and links in the different routes, and the events that occurred along those routes during the duration of a call, in various ways. In one such way, the dropped packet count for calls for which the path changed during the call are ignored. In another way, the dropped packet count for calls are assigned to each node, and link in all best paths that occurred during the time the call was in progress, and in another way, the dropped packet count is pro-rated among the nodes and links in each path according to the amount of time the path was the best path in proportion to the duration of the call.

Assigning Dropped Packets to Events

Similarly, the dropped packet count may be assigned to any events that occurred during a call in different ways. One way is to have the dropped packet count ignored for the purpose of increasing the counter for each event if there was more than one event during the call. Another way is to have all the dropped packet counts for a call assigned to each event. Still another way is to have the dropped packets equally divided among all of the events.

Reports

A report can be provided that shows, for each node and link through which a call during the period of study flowed, an identifier of the node or link and the number of dropped packets assigned to that node or link, sorted, in descending order of number of dropped packets assigned, in a two column list. Nodes corresponding to telephones are specially marked on the list. The number of packets assigned to each event can also be displayed in this list or a different list. The number of dropped packets assigned to each prefix may also be displayed in this list or another list. A system administrator, or the system and method, can scan down the list looking for significant drops in the number of dropped packets. The nodes, links, prefixes and events above the significant drops indicate potential problems that can be investigated.

An Enhancement: at Path Change, Ask Call Detail Manager for a Dropped Packet Count or Counts when Path Changes In one embodiment of the present invention, the system and method recording the routing messages receives from the call manager in real time the IP addresses of the two telephones establishing the call. The system and method identifies the best path between the two phones and monitors that path. If the path changes, the system and method signals to the call manager, which, in response, provides the number of dropped packets in one or both directions, from either a time at the start of the call or at the last time the call manager was so signaled. In this manner, the number of dropped packets can be more accurately assigned to the links and nodes in the different paths over which a call traverses.

Although the method and apparatus are described for voice over IP call dropped packets, the system and method may be used to correlate any form of reported problem with network failures.

Description

Figure 2A:
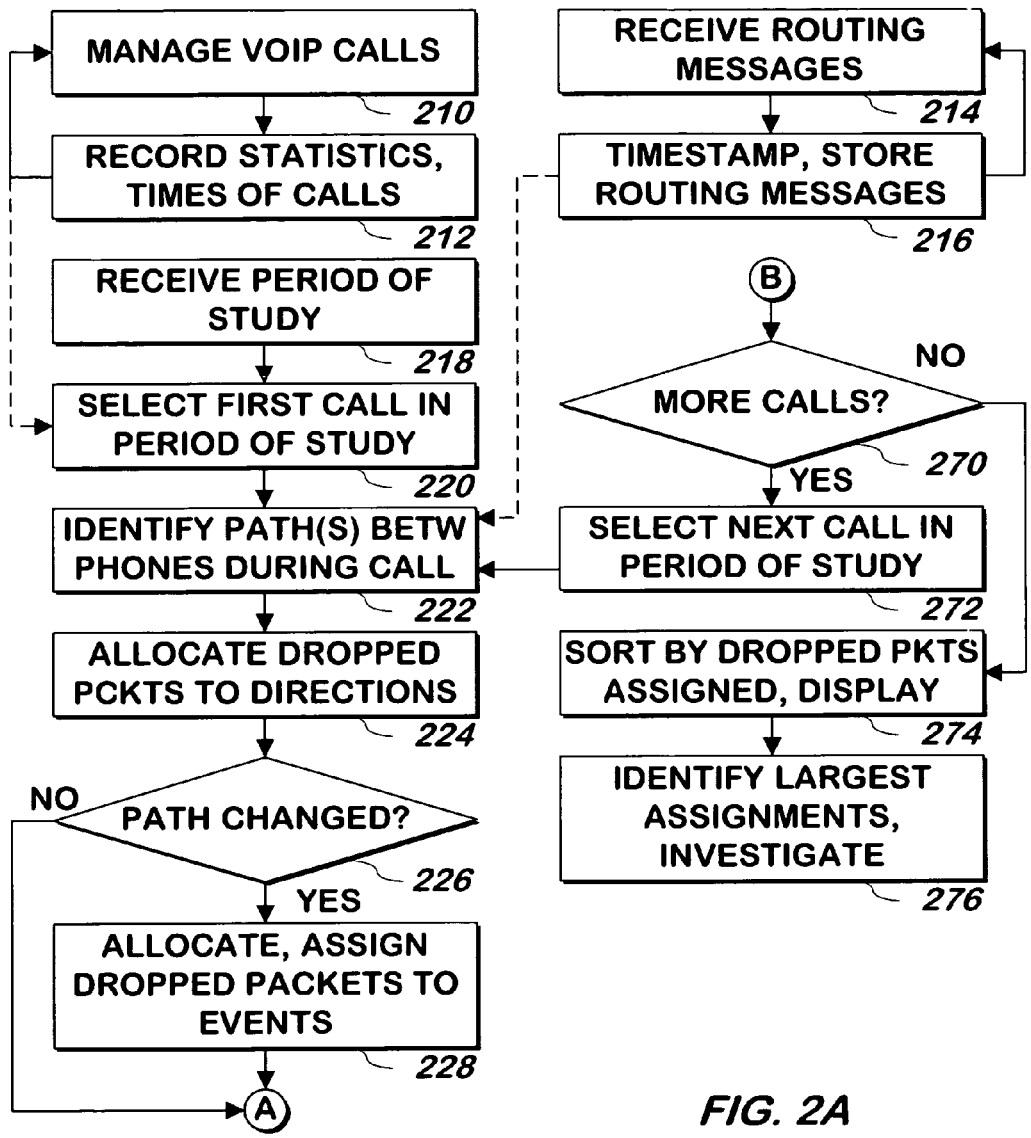
FIG. 2, consisting of FIGS. 2A and 2B, is a flowchart illustrating a method of providing information to assist in the troubleshooting of a network handling voice over Internet Protocol traffic according to one embodiment of the present invention.

Referring now to FIG. 2, a method of associating dropped packets in a voice over IP telephone system with the links, nodes, prefixes, and events corresponding to the dropped packets is shown according to one embodiment of the present invention. Voice over IP calls are managed 210 as performed by a conventional call manager and call detail records including the IP addresses of the phones connected in the call, the date and time the call was established and terminated and the number of dropped packets recorded for the call, or each direction of the call, is stored 212. Steps 210 and 212 may be performed by an independently running process or processes that repeats steps 210 and 212 for multiple calls, and the call detail records may be received from one or more call managers managing the calls from any number of telephones.

Another process receives 214 conventional ISIS, OSPF, EIGRP, BGP, and other routing messages and stores them 216, associated with the date and time of receipt of such messages, such date and time optionally retrieved from a source that may be synchronized with the call manager or other source of call detail records, so that the dates and times used in steps 212 and 216 are synchronized.

A period of study may be received 218. A first call detail record having a duration either wholly or at least partially in the period of study and recorded as part of step 212 is selected, and the path or paths that would be used in each direction between the IP addresses corresponding to the telephones used in the call are identified using the routing messages recorded during the period beginning a threshold amount of time before the call to the time the call was terminated. The routes may be identified using conventional path identification techniques such as Dijkstra's algorithm. The threshold amount of time may be the amount of time in which all routers periodically send a new version of their routing information (as opposed to update messages) or the amount of time required to build a model of the network because the amount of time will include a complete set of routing messages for the network.

The number of dropped packets or dropped packets in the direction to which the path corresponds, are allocated 224 to the directions of the call. In many cases, the call manager identifies the direction of the dropped packets, and so the corresponding number of dropped packets for each direction are allocated to that direction. If a call manager did not so identify the direction, half the dropped packets may be allocated to each direction.

If the path for a direction changed during the call 226, the dropped packets allocated to the corresponding direction are allocated and assigned 228 to each event that occurred, an event being a change in path between the phones in the call. The allocation among the events may be performed by assigning all of the dropped packets (or none of the dropped packets) for a corresponding direction to the events that occurred, dividing them equally among the events, or dividing them in proportion to the amount of time allocated to each event. This amount of time may be the amount of time before the event up to the prior event or start of the call, the amount of time after the event to the next event or the end of the call, or half of each of the prior two amounts of time or another allocation. An assignment to an event is made by adding the number of dropped packets allocated to that event to any existing number of dropped packets already assigned to that event.

The method continues at step 238. If there are no path changes 226, the method continues at step 238.

At step 238, a direction is selected. The dropped packets allocated to the selected direction are allocated 240 to the different paths that were identified for the selected direction in step 222—either by allocating all of them (or none of them) to all paths, equally dividing the number of dropped packets allocated to the direction in which the path applied by the number of paths, or dividing the number of dropped packets allocated to the direction in which the path applied according to the percentage of time during the call that the path applied.

If there are no path changes for the selected direction, all of the dropped packets allocated to the selected direction corresponding to the path are allocated 240 to the one path between the telephones in the selected direction.

The first path in the selected direction is selected 242 and the first node in the selected path is selected 244. If the selected node is a phone 246 (the selected node is a phone if it is the first or last node in the path), the node is marked as corresponding to a phone 248 and otherwise 246 the node is not so marked. Step 248 may include assigning the dropped packets to a prefix reported by the routers that corresponds to the phone, by adding the number of dropped packets to a counter for that prefix. In one embodiment, the number of dropped packets is only assigned to the prefix of the originating phone, and so the assignment of dropped packets to a prefix may be performed in step 244 instead of step 248.

The dropped packets allocated to the selected direction and path are assigned 250 to the selected node. Dropped packets are assigned to a node by adding the number of dropped packets to a counter for the selected node that counts for that node all dropped packets assigned to the node during the period of study. If there are more nodes in the path selected in step 252, the dropped packets are assigned 254 to the link from the selected node to the next node in the path (by adding the number to a counter for that link), the next node in the selected path is selected 256 and the method continues at step 246 using the selected node.

If there are no more nodes in the selected path 252, if there are more paths in the selected direction 258, the next path in the selected direction is selected 260 and the method continues at step 244 using the selected path. If there are no more paths in the selected direction 258, if there are more directions 262, the next direction is selected 264 and the method continues at step 242 using the newly selected direction, and otherwise 262, the method continues at step 270.

At step 270, if there are more calls in the period of study, the next call is selected 272 and the method continues at step 222 using the newly selected call, and otherwise 270, the numbers of dropped packets assigned to the links and nodes are sorted in decreasing order of the number of dropped packets, and a list of nodes and links in one column, and dropped packets assigned to the node or link in another column, is displayed 274. In one embodiment, step 274 includes identifying the nodes marked as corresponding to telephones. As part of step 274, list of prefixes and their assigned dropped packets may be included in the sorted list, or may be sorted in decreasing order of assigned dropped packets and reported separately. As part of step 274, a list of events and their assigned dropped packets may be included in the sorted list, or may be sorted in decreasing order of assigned dropped packets reported separately.

A system administrator may use 276 the list or lists to identify potential areas of a network to be investigated for reducing the number of dropped packets, by investigating nodes, links, prefixes or events on that list or lists that have a large number of dropped packets assigned to them, relative to the other items on the list.

Figure 3:
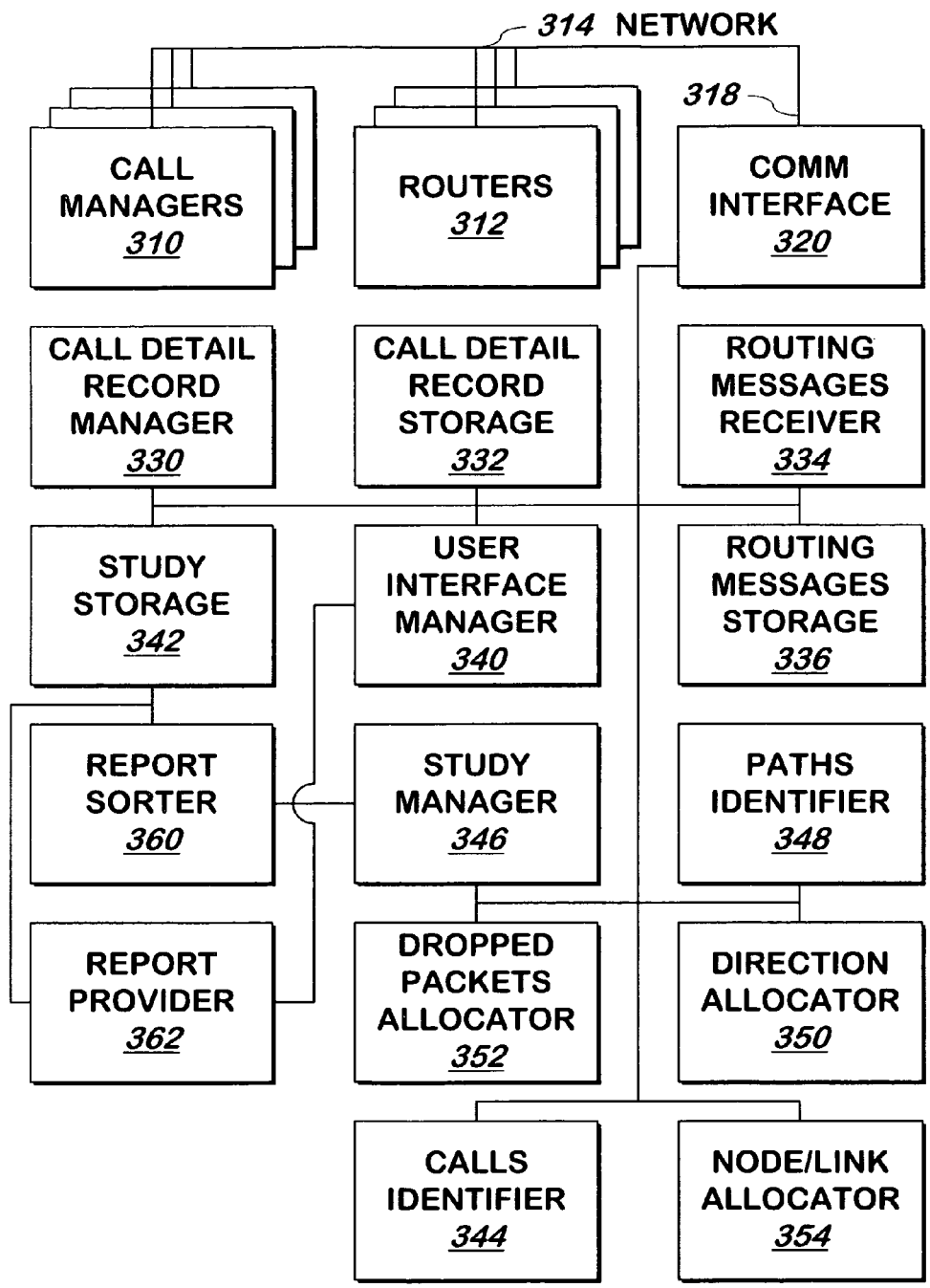
FIG. 3 is a block schematic diagram of a system for providing information to assist in the troubleshooting of a network handling voice over Internet Protocol traffic according to one embodiment of the present invention.

Referring now to FIG. 3, a system for assisting a system administrator pinpoint problems on a network handling voice over Internet Protocol traffic is shown according to one embodiment of the present invention.

Conventional call managers 310 used in voice over Internet Protocol telephony systems produce call detail records as described above and provide them to a specially configured IP address and port of communication interface 320. There may be any number of call detail managers 310, each managing calls between any number of telephones.

Communication interface 320 includes a conventional communication interface that supports Ethernet, TCP/IP and other communication protocols and communicates with a network 314, such as an Ethernet network, the Internet, or both, via input/output 318. When communication interface 320 receives a communication having the special destination IP address and port, it forwards the communication to call detail record manager 330.

Call detail record manager 330 receives such communications and reassembles them into call detail records if necessary. Call detail record manager 330 assigns a unique identifier to each call detail record and stores the call detail records it receives and their unique identifiers into call detail storage 332, indexed by the start date and time and stop date and time of the call corresponding to the call detail record.

Substantially independently of the above actions, routers 312 send conventional routing messages via network 314 as described above, and such routing messages are received by communication interface 320. Communication interface 320 forwards such routing messages to routing messages receiver 334, which timestamps them with the date and time of receipt and stores them into routing messages storage 336. Any number of routing messages may be received from each of any number of routers 312 and stored by routing messages receiver 334. The clock used for the timestamp may be synchronized with the clock used by the call managers.

Routing messages storage 336 and call detail record storage 332 may each be arranged as a conventional double circular buffer to allow information to be written to, and read from, each of them substantially simultaneously.

When a system administrator wishes to analyze dropped packets, the system administrator communicates using a conventional personal computer system with user interface manager 340 via communication interface 320 by connecting to a specific IP address and port for which communication interface forwards all communications to user interface manager 340. In response, user interface manager 340 provides a user interface that allows the system administrator to define the beginning and end of a period of study. The system administrator provides such beginning and end to user interface manager 340, which stores the beginning and end of the period of study into study storage 342. User interface manager 340 then signals calls identifier 344 with the beginning and end of the period of study.

Calls identifier 344 identifies the call detail records in call detail record storage 332 that are either wholly, or partially in the period of study as defined by the beginning and end of the call corresponding to the record. Calls identifier 344 builds an index of such calls, stores the index into study storage 342 and signals study manager 346.

When so signaled, study manager 346 selects the first call detail record on the index and provides an identifier of the call detail record to paths identifier 348. Paths identifier 348 identifies the one or more paths that a call between the two phones identified in the call detail record corresponding to the identifier it receives using the routing information in routing message storage for the period before and during the call corresponding to the call detail record corresponding to the identifier it receives, and stores into study storage 342 a path record for each path in each direction the call traversed, the path record containing the effective date and time that the call began using the path (either the start of the call or the date and time of the routing message indicating a different path was used, described below), an indication of the direction of the path (or the direction may be implied from the order of the IP address of the phones in the path) and identifiers of the nodes in the best path.

In one embodiment, paths identifier 348 identifies an initial path by starting at a phone node, and identifying the next hop node in the same manner as a conventional router would using the routing messages to identify the best next hop node in the direction of the other phone node using the routing messages to identify the next hop node as of the start of the telephone call. Paths identifier 348 repeats this process from the second phone in the call to the first phone, again using routing messages in effect at the start of the call.

Paths identifier 348 then scans the routing messages in order from the time the call started up to the time the call completed to identify any messages that would indicate a routing change event had occurred in the paths it had identified. If paths identifier 348 locates such an event, it stores into study storage 342 an event record including an identifier of the event, its direction (from phone A to B or from phone B to A), the identifier of the call detail record, and the date and time the message indicating the path change was received. Paths identifier 348 then recalculates the path or paths affected by the event and stores into study storage 242 an additional one or more path records corresponding to the newly calculated path, but uses the date and time the routing message was received that triggered the path change. Paths identifier 348 continues attempting to identify any path changes for the call after the initial paths are identified using routing messages received from the date and time the call started until the date and time the call terminated.

When paths identifier has completed identifying the paths and event, in one embodiment, it signals direction allocator 350, and in another embodiment, signals dropped packets allocator 352. In each case, it provides the identifier of the call detail record it received.

When signaled, direction allocator 350 allocates the dropped packets to each direction if not already specified in the call detail record corresponding to the identifier it receives by amending the call detail record to specify that half or approximately half of the dropped packets occurred in each direction. Direction allocator 350 then signals dropped packets allocator 352 with the identifier of the call detail record it receives.

When signaled, dropped packets allocator 352 allocates the dropped packets specified for each direction in the call detail record corresponding to the identifier it receives to the event records corresponding to the call detail record and direction, that are located in study storage 342 by adding some or all of the dropped calls count to the event records having the identifier of the call detail record it receives and again allocates the dropped packets to the path records having the identifier of the call detail record it receives and in the direction corresponding to the number of dropped packets as described above.

Dropped packets allocator 352 searches the routing messages in routing messages storage 336, from the time the call was initiated, backwards in time, to locate the first routing message having a prefix corresponding (i.e. including) the IP address of one of the telephones in the call. Dropped packets allocator 352 then searches study storage 342 for a prefix record having a prefix matching the one it locates. If it does not find such a prefix record, it builds one in study storage 342 and stores in the record the prefix, and the dropped packet count from the phone corresponding to the prefix. If it locates the prefix record, it adds the dropped packet count from the call detail record corresponding to the phone that corresponds to the prefix record to the dropped packet count in the prefix record. Dropped packets allocator 352 then repeats this process for all other telephones in the call, as set forth by the call detail record.

When dropped packets allocator 352 has completed the allocation of dropped calls to events, prefixes and paths, dropped packets allocator 352 provides the identifier of the call detail record it receives to node/link allocator 354.

When so signaled with the identifier of a call detail record, node/link allocator 354 selects each path record having the call detail record having the identifier it receives, and allocates the number of dropped packets in the path record to each node in the path record and to each link between the nodes of the path record. To do so, node/link allocator 354 looks in study storage 342 for a node record corresponding to the first node in the path, and if it locates one, it adds the number of dropped packets allocated to the path record to a dropped packet count for the node record. If it does not locate one, it builds in study storage 342 a node record containing the identifier (e.g. IP address) of the node in the path, and initializes the dropped packet count to the dropped packet count in the path record. Node/link allocator 354 marks the node records for the terminal nodes in the path as telephone nodes. Node/link allocator 354 performs this same process for each link in the path between pairs of nodes, using a link record rather than a path record, and adding the identifiers of both nodes for any link it builds as the identifier of the link, and initializing or adding the dropped packets to the dropped packet count for the link record in study storage 342 in the same manner as it did for the node records.

Node/link allocator 352 then repeats this process for each path record corresponding to the identifier it receives and, when no additional unprocessed path records corresponding to the call detail record identifier it receives remain unprocessed, node/link allocator 354 signals study manager 346. Study manager 346 selects the next call detail record on the index and repeats the process described above using that call detail record. This process is repeated until all call detail records on the index are processed in the manner described above, at which point, study manager 346 signals report sorter 360.

When signaled, report sorter 360 sorts the node and link records either separately or together and sorts the prefix records and event records either alone or with the other records, in decreasing order of dropped packet counts, and signals report provider 362. Report provider 362 generates a report as described above and provides the report to user interface manager 340, which provides the report to the user. The user may then use the report to cause the nodes, links or prefixes with the highest dropped packet count to be investigated, for example, by providing a list of the links, nodes or prefixes with the highest dropped packet count to a party who can investigate whether corrective measures are required.

What is claimed is:

1. A method of providing information for correcting network problems, comprising:
   receiving information concerning each of at least one use of the network, the information comprising a start time of the use, an end time of the use, and at least one number of packets dropped by the network and related to the use;
   receiving a plurality of messages for identifying at least one route between each of a plurality of nodes on the network;
   storing each of the plurality of messages, each message stored associated with at least one time corresponding to said message;
   identifying at least one path that was at least likely to have been taken for each of the at least one use by locating from among the stored plurality of messages at least one of the plurality of the stored messages received that is associated with a time corresponding to at least one of the start time and end time of each said use, responsive to the times with which the plurality of messages are associated and at least one of the start time of the at least one use and the end time of the at least one use;
   for each of the at least one use of the network, adding, to contents of a counter for each of a plurality of entities on the at least one path identified for said use, a number responsive to at least one of the number of packets dropped that was received for the use; and
   providing the contents of at least some of the counters.

2. A system for providing information for correcting network problems, comprising:
   a call detail record manager having an input for receiving information concerning each of at least one use of the network, the information comprising a start time of the use, an end time of the use, and at least one number of packets dropped by the network and related to the use, the call detail record manager for providing said information at an output;
   a routing messages receiver having an input for receiving plurality of messages for identifying at least one route between each of a plurality of nodes on the network, the routing messages receiver for storing via an output each of the plurality of messages, each message stored associated with at least one time corresponding to said message;
   a path identifier having an input coupled to the routing messages receiver output for receiving the messages, the path identifier for identifying and providing at an output at least one path that was at least likely to have been taken for each of the at least one use by locating from among the stored plurality of messages at least one of the plurality of messages received associated with a time corresponding to at least one of the start time and end time of said use, responsive to the times with which the plurality of messages are associated and at least one of the start time of the at least one use and the end time of the at least one use;
   a dropped packets allocator having an input coupled to the call detail record manager output for receiving the information and to the path identifier output for receiving the at least one path, the dropped packets allocator for, for each of the at least one use of the network, adding, to contents of a counter for each of a plurality of entities on the at least one path identified for said use, a number responsive to at least one of the number of packets dropped that was received for the use; and for providing the contents of at least some of the counters at an output.

* * * * *